Patented May 22, 1945

2,376,354

UNITED STATES PATENT OFFICE 2,376,354

STABILIZED DIOXOLANES

William Franklin Gresham, Wilmington, Del., assignor to E. I. du Pont de Nemours & Company, Wilmington, Del., a corporation of Delaware No Drawing. Application November 21, 1941, Serial No. 419,909

1 Claim. (Cl. 260—2)

This invention relates to a process for the stabilization of dioxolanes and more particularly to the treatment of polydioxolanes and their modification products with antioxidants.

Polydioxolane, obtained by the polymerization of 1,3-dioxolane by means of a catalyst or from other sources, as well as modified forms thereof resulting, for example, from the reaction of the polymer with acids, alcohols, esters, and the like have been found to be relatively unstable upon exposure to air or oxygen. This instability is more apparent in the higher molecular weight polymers and consequently uses based on the desirable characteristics of the polymers as prepared are restricted.

An object of the present invention is to provide a process for stabilizing dioxolanes and modification products thereof. Another object is to provide antioxidants for 1,3-dioxolane and its modification products. Yet another object is to provide a process for making age-resistant polydioxolane, especially age-resistant high molecular weight polydioxolane and age-resistant high molecular weight polymeric modification products of polydioxolanes with organic acids, esters, alcohols, and the like. Other objects and advantages of the invention will hereinafter appear.

High molecular weight polydioxolane and high molecular weight modified products thereof, as prepared, are tough, flexible resin-like products having considerable elasticity and high tensile strength. These properties are, however, not permanent for the compounds gradually lose these desirable properties after exposure to air or oxygen and become hard and brittle. It is believed that oxidation of the polymeric compounds is responsible for this phenomenon, although some polymers retain their flexibility and toughness for longer periods than others indicating that there are other contributing factors. Monomeric 1,3-dioxolane likewise deteriorates on exposure to air or oxygen, peroxides being formed which contaminate the monomer and limit the utility of the polymer made therefrom. It has been found that this aging and/or oxidation and/or peroxide formation can be inhibited and in some instances entirely prevented by the use of antioxidants and more particularly by the use of non-volatile bases of the aromatic and heterocyclic series with two amino groups, or one amino and one hydroxyl group. Antioxidants generally which are effective in the treatment of rubber, latex and the like are likewise suitable.

The polymers that can be stabilized in accord with this invention include the polymers of 1,3-dioxolane as disclosed in U. S. application S. N. 392,124, and more particularly the polymers of higher molecular weight obtained in accord with the process of that application such, for example, as those having a molecular weight from approximately 1000 to in the order of 200,000. Such polymers may be prepared from 1,3-dioxolane by contacting it with a catalyst such as sulfuric acid, or boron trifluoride, preferably while under reflux. These polymers may likewise be prepared by the interaction of a vicinal glycol, such as ethylene glycol, 1,2-propylene glycol, etc., with formaldehyde in the presence of similar catalysts, the reaction being conducted under reflux, the water formed as a result of the reaction being removed as formed. The products obtained from these reactions may be characterized as glycol formals and polyglycol formals specific members of the class being (methoxymethoxy) ethanol, $CH_3OCH_2OCH_2CH_2OH$; di($\beta$hydroxyethyl) formal, $(HOCH_2CH_2O)_2CH_2$; methyl ($\beta$methoxyethyl) formal, $(CH_3O)(CH_3OCH_2CH_2O)CH_2$; $\beta$(methoxy-alpha-ethoxy) ethanol,

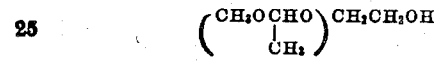

and similar glycol formals. Such a process and the products derivable therefrom are disclosed in U. S. application S. N. 392,125. High molecular weight products obtained in accord with the process described in U. S. application S. N. 392,126 may likewise be employed. The process of this application involves the reaction of vicinal glycols with formals using reaction conditions and catalysts above described, and in this instance in order to obtain the higher molecular weight polymers the alcohol formed as a result of the reaction is removed until a polymer of the desired molecular weight has been obtained. High molecular weight polymers obtained in accord with the process of U. S. application S. N. 392,126 may likewise be stabilized in accord with this invention, the products of this application being prepared by the treatment of compounds containing both a formal and an alcohol group such as di-($\beta$hydroxyethyl) formal, the reaction being carried out under the conditions specified above and U. S. application S. N. 392,124.

It is likewise possible to stabilize the products disclosed above which have been modified by combining them with other organic or inorganic compounds, such modified products being prepared by the interaction of, for example, the products of the above enumerated applications Serial Nos. 392,124; 392,125, and 392,126, with an alcohol, acid, ester, or other suitable modifying agents, the reaction being conducted by heating the reactants while in contact with a suitable catalyst such as sulfuric acid. These modified polymeric products, all of which are closely related to polymeric 1,3-dioxolane, are more fully described in U. S. applications S. N. 392,128 and 392,363.

The antioxidants that can be used in accord with this invention include the non-volatile bases of the aromatic and heterocyclic series of compounds which contain two amino groups or one amino and one hydroxyl group and other antioxidants, especially those known to be useful in stabilizing rubber. As examples of such compounds are included:

Amino- or hydroxy-compounds:
    Para-hydroxydiphenyl
    Hydroquinone
    Para-aminophenol
    p,p'-Diaminodiphenylmethane
    2,4-meta-toluylene diamine Secondary amines:
    Diphenylamine
    o- and p-Ditolylamines
    Phenyl-alpha-naphthylamine
    Phenyl-beta-naphthylamine ("Neozone" D)
    Phenyl-beta-naphthylnitrosamine
    Symmetrical di - beta - naphthyl - para-phenylenediamine ("Age-Rite White")
    Symmetrical diphenyldiamino-ethane
    2,4-diaminodiphenylamine Condensation products of amines with carbonyl compounds, e. g.
    Of aniline with acetaldehyde,
    Of alpha-naphthylamine with aldol,
    Of aniline with acetone, and
    Of diphenylamine with acetone Other antioxidants:
    Glycolic aldehyde
    Glyoxal
    Hydroxy aldehydes from the condensation of formaldehyde with itself and especially the hydroxyaldehydes so prepared
    Reducing sugars Amino acid esters such as tryosine esters For use in the liquid monomeric and polymeric compounds metal antioxidants may be used, to prevent peroxide formation, such, for example, as copper, nickel, iron, etc.

The antioxidants other than the metals may be incorporated into the unpolymerized 1,3-dioxolane or its modification products prior or subsequent to polymerization and preferably in the amount ranging from 0.1 to 5.0 parts thereof by weight per 100 parts by weight of the dioxolane used, the monomeric mixtures being then subjected to polymerization. The metals are merely placed in contact with the monomer, although the effectiveness of copper may be increased by reduction prior to use.

The examples of antioxidant treated and untreated polydioxolane which follow illustrate the advantages of the invention.

To 320 parts of 1,3-dioxolane, which had been purified by distillation from sodium hydroxide, was added .091 part of gaseous BF₃ and the mixture well agitated to insure uniform distribution of the BF₃ in the 1,3-dioxolane. The mixture was allowed to stand at 6° C. for 7 days. During this time the 1,3-dioxolane polymerized, and changed from a mobile colorless liquid to a tough opaque solid. The solid polydioxolane was reduced to small particles to facilitate dissolution and portions were worked up in various ways as follows:

A. 40 parts of the polydioxolane was dissolved in 300 parts of water containing 1 part of aqua ammonia by stirring and warming. 0.03 part of sodium hydroxide was added to completely neutralize the BF₃ catalyst. The viscous solution was then heated to from 75–90° C. at which point the polydioxolane became insoluble in the water and separated as a second phase. The clear supernatant liquid was poured off and the viscous mass of polydioxolane was poured on a glass plate to dry at room conditions. The film of polydioxolane was dry in 5 days.

B. 40 parts of the polydioxolane was dissolved in 300 parts of water containing 1 part of aqua ammonia by stirring and warming. 0.03 part of sodium hydroxide was added to completely neutralize the BF₃ catalyst. The viscous solution was then heated to from 75 to 90° C. at which point the polydioxolane becomes insoluble in the water and separated as a second phase. The clear supernatant liquid was poured off leaving the polydioxolane as a viscous mass. This material was washed by redissolving in 300 parts of water, heated to from 75° to 90° C. to precipitate the polymer and the clear supernatant wash water decanted. This washing process was repeated until the wash water was neutral to litmus. The viscous polydioxolane was poured on to a glass plate to dry. The film was dry in 5 days.

C. 40 parts of polydioxolane was worked up in exactly the same way as described in part B except that 2 parts of "Neozone" D (phenyl β-naphthyl amine) was added to the last wash water. The film was dry in 2 days.

D. 40 parts of polydioxolane was worked up in exactly the same manner as part B except that 2 parts of "Age-Rite White" was added to the last wash water. The film was dry in 2 days.

E. 40 parts of polydioxolane was worked up in exactly the same manner as part B except that 2 parts of hydroquinone was added to the last wash water. The film was dry in 5 days.

All of the above polydioxolane films, when dry, were initially tough and pliable and could be cold drawn. The films from parts A and B after standing exposed to the atmosphere for 7 days had lost their initial toughness, pliability and ability to be cold drawn and had become weak and brittle. The films from parts C, D, and E after standing exposed to the atmosphere for 90 days retained their toughness, pliability and ability to be cold drawn.

From the examples given it is evident that the polymeric products which have been treated with an antioxidant are not subject to the rapid deterioration normally incident to the aging of the polymers not so treated. It should be noted, however, that polymerization of 1,3-dioxolane is conducted with acid catalysts which are neutralized subsequent to the reaction and accordingly antioxidants which give colored decomposition products in alkaline solution should not be added prior to polymerization unless the discoloration is unobjectionable.

The antioxidants may be milled into or otherwise intimately incorporated with the solid polymer. Moreover, inasmuch as the oxidation of the solid polymers appears to be more or less a surface effect gradually progressing into the center of the particular article or mass of the polymer it is in some instances sufficient to surface-coat such polymers with the antioxidant mixture or solution thereof in order to prevent contact of the polymer itself with oxygen or air. Surface treatment is ordinarily not as universally applicable as the incorporation of the antioxidants directly into the polymer but is in many instances sufficiently effective for protecting formed shapes.

It is understood that the term "treating" as employed in the appended claim is used in a generic sense to include either the incorporation of the antioxidants into the polydioxolane or its compounds or its modified products prior to polymerization, during polymerization, or subsequent thereto or to surface treatment with the antioxidant as a dry mixture containing it or as a solution thereof. The term "polydioxolane compound" is likewise used in a generic sense and includes the 1,3-dioxolane polymers, their liquid or solid forms, their modification products described herein and in the specifications referred to; and to the polymeric glycol formals, above described.

I claim:

Solid 1,3-dioxolane polymer, having a molecular weight between 1,000 and 200,000, containing 0.1 to 5.0 parts of symmetrical di-beta-naphthyl-para-phenylenediamine per 100 parts of the polymer.

WILLIAM FRANKLIN GRESHAM.